United States Patent
Park

(10) Patent No.: US 11,268,213 B2
(45) Date of Patent: *Mar. 8, 2022

(54) CORE-FREE THERMOPLASTIC POLYURETHANE YARN WITH ADDED NANOSILICA

(71) Applicant: Heedae Park, Busan (KR)

(72) Inventor: Heedae Park, Busan (KR)

(73) Assignee: Heedae Park, Busan (KR)

( * ) Notice: Subject to any disclaimer, the term of this patent is extended or adjusted under 35 U.S.C. 154(b) by 49 days.

This patent is subject to a terminal disclaimer.

(21) Appl. No.: 16/571,429

(22) Filed: Sep. 16, 2019

(65) Prior Publication Data

US 2020/0010981 A1  Jan. 9, 2020

Related U.S. Application Data

(63) Continuation-in-part of application No. 15/479,564, filed on Apr. 5, 2017, now Pat. No. 10,450,437.

(30) Foreign Application Priority Data

Oct. 10, 2016 (KR) .................. 10-2016-0130490
Oct. 24, 2016 (KR) .................. 10-2016-0138458
Mar. 6, 2017 (KR) .................. 10-2017-0028116

(51) Int. Cl.

| | | |
|---|---|---|
| D01F 1/10 | (2006.01) |
| C08L 75/04 | (2006.01) |
| C08J 3/22 | (2006.01) |
| C08K 3/36 | (2006.01) |
| D02G 3/04 | (2006.01) |
| D01F 8/16 | (2006.01) |
| D01F 6/70 | (2006.01) |
| C08K 3/013 | (2018.01) |
| C08G 18/65 | (2006.01) |

(52) U.S. Cl.

CPC ............ *D01F 1/10* (2013.01); *C08G 18/6511* (2013.01); *C08J 3/226* (2013.01); *C08K 3/013* (2018.01); *C08K 3/36* (2013.01); *C08L 75/04* (2013.01); *D01F 6/70* (2013.01); *D01F 8/16* (2013.01); *D02G 3/045* (2013.01); *C08K 2201/005* (2013.01); *C08K 2201/011* (2013.01); *C08L 2203/12* (2013.01); *C08L 2205/025* (2013.01); *C08L 2207/20* (2013.01); *C08L 2310/00* (2013.01)

(58) Field of Classification Search

CPC ........ C08G 18/6511; C08J 3/226; C08K 3/36; C08K 3/013; C08K 2201/011; C08K 2201/005; C08L 75/04; C08L 2203/12; C08L 2205/025; C08L 2207/20; C08L 2310/00; D01F 6/70; D01F 8/16; D01F 1/10; D02G 3/045

See application file for complete search history.

(56) References Cited

U.S. PATENT DOCUMENTS

| | | |
|---|---|---|
| 6,294,606 B1 | 9/2001 | Chen et al. |
| 9,914,808 B2 | 3/2018 | Park |
| 9,914,819 B2 | 3/2018 | Park |
| 9,915,026 B2 | 3/2018 | Park |
| 9,915,027 B2 | 3/2018 | Park |
| 2001/0000801 A1 | 5/2001 | Miller et al. |
| 2001/0002444 A1 | 5/2001 | Zilla et al. |
| 2001/0025093 A1 | 9/2001 | Ishizaki et al. |
| 2004/0123366 A1 | 7/2004 | Schorr et al. |
| 2006/0083694 A1 | 4/2006 | Kodas et al. |
| 2009/0242847 A1 | 10/2009 | Hosoya et al. |
| 2009/0326128 A1 | 12/2009 | Macossay-Torres |
| 2013/0115447 A1 | 5/2013 | Blanchard et al. |
| 2013/0273285 A1 | 10/2013 | Vedula et al. |
| 2017/0369675 A1 | 12/2017 | Park |
| 2017/0370045 A1 | 12/2017 | Park |

FOREIGN PATENT DOCUMENTS

| | | |
|---|---|---|
| KR | 10-1318135 B1 | 10/2013 |
| KR | 10-1341054 B1 | 12/2013 |
| KR | 10-1341055 B1 | 12/2013 |
| KR | 10-1530149 B1 | 6/2015 |
| WO | 2006079098 A1 | 7/2006 |
| WO | 2014189993 A1 | 11/2014 |

OTHER PUBLICATIONS

Brazil search report dated Aug. 18, 2020 of the Brazil Patent Application No. BR112019006550-4, which corresponds to the above-identified application.

*Primary Examiner* — Patrick D Niland

(74) *Attorney, Agent, or Firm* — Goldilocks Zone IP Law

(57) ABSTRACT

The present invention provides a resin for thermoplastic polyurethane (TPU) yarn using nanosilica and a method for manufacturing the same, where nanosilica having a particle size of 100 nm or less is added as a thickening agent for improving productivity in the production of and glossiness of TPU yarns, such as mono-filament TPU yarns having a denier count of 50 to 350 or multi-filament TPU yarns having a denier count of 50 or less without applying a coating of TPU to the surface of polyester or nylon yarns, thereby securing desired workability and properties and realizing continuous drawing of TPU yarns without thread breakage. The content of nanosilica from 0.3 to 7 phr in TPU resin is optimal for productivity of mono- or multi-filament yarns, whereas the content of nanosilica from 0.5 to 1.5 phr is optimum for both productivity and cost reduction.

8 Claims, No Drawings

CORE-FREE THERMOPLASTIC POLYURETHANE YARN WITH ADDED NANOSILICA

REFERENCE TO RELATED APPLICATIONS

This application is a continuation-in-part patent application claiming the benefit of pending U.S. patent application Ser. No. 15/479,564 filed on Apr. 5, 2017 (published as US 2018/0100050), which claims the priority benefit of Korean Patent Application No. 10-2016-130490 filed on Oct. 10, 2016, Korean Patent Application No. 10-2016-138458 filed on Oct. 24, 2016, and Korean Patent Application No. 10-2017-28116 filed on Mar. 6, 2017, the entire contents of which are incorporated herein by reference.

FIELD OF THE INVENTION

The present invention generally relates to a thermoplastic polyurethane (TPU) and more particularly to core-free thermoplastic polyurethane yarns with added nanosilica.

BACKGROUND OF THE INVENTION

The yarns for footwear upper and similar industrial products are mostly formed of polyester, nylon, acryl resin, or the like. The fabrics processed from those yarns are not only poor in durability and wear resistance, but also problematic in many aspects including adhesiveness, so they are unfit to use for high level functionality such as of footwear fabrics or the like.

Currently, a solution to this problem is a yarn (hereinafter, referred to as "coated yarn") the surface of which is coated with a thermoplastic resin in order to enhance the strength of the yarn. Such a coated yarn is generally fabricated by applying a coating of a thermoplastic resin such as PVP or PP or a thermoplastic polyurethane resin on a yarn like polyester or nylon in a dice using a general extruder.

But, when using a general thermoplastic resin, it is difficult to control the amount of the coating, particularly making it impossible to use a small amount of the coating, ending up producing a thick coated yarn having a high denier count above 350 and leading to deterioration in durability and wear resistance.

In an effort to solve this problem, as can be seen from the following four patent documents, namely, KR 10-1341054 B1 (patented in Korea on Dec. 6, 2013), KR 10-1341055 B1 (patented in Korea on Dec. 6, 2013), KR 10-1318135 B1 (patented in Korea on Oct. 8, 2013), and KR 10-1530149 B1 (patented in Korea on Jun. 12, 2015), the inventors of the present invention have been sustained research and development on a fabrication method for coated yarn, a compound for coated yarn, a thermoplastic polyurethane coated yarn, etc. since 2012.

These prior patents/references may describe producing coated yarns with excellent wear resistance, adhesiveness, water resistance, molding properties, etc. Yet, the coated yarns of the prior patents/references are bound to have a core like polyester or nylon, which results in large thicknesses, making it impossible to realize thin coated yarns.

Besides, the TPU coated yarns disclosed in the patents/references have such a viscosity not as high as polyester or nylon due to the characteristics of the thermoplastic polyurethane, so that a thickening agent is necessarily used for the sake of smooth implementation of the extrusion process.

For single yarns, however, things are different from the TPU coated yarns of the prior patents/references. Silica of a normal size may be used as a thickening agent for thick mono-filament yarns, but it cannot be used for thin multi-filament yarns, more specifically for multi-filament yarns having a denier count of less than about 50. Even in the case of mono-filament yarns (for example, mono-filament yarns having a denier count of 50 to 350) using general silica, thread breakage (namely, the situation when the thread breaks or snaps) occurs inevitably frequently in the drawing process. This makes it impossible to produce TPU yarns continuously and hence leads to low productivity.

Therefore, silica of the normal size as suggested above is not appropriate for the continuous production of TPU yarns, i.e., to draw mono- or multi-filament yarns comprised of thermoplastic polyurethane continuously. In particular, general silica is unfit to use as a thickening agent in drawing thin TPU yarns (namely, a single filament yarn that is less than 50 denier for multi-filament yarn and between 50 to 350 denier for mono-filament yarn) continuously without thread breakage.

SUMMARY OF THE INVENTION

The present invention discloses a much better solution than thermoplastic polyurethane coated yarns known in the art and disclosed in the prior documents. The object of the present invention is to provide a resin for a thermoplastic polyurethane (TPU) yarn using added nanosilica and a method for manufacturing a core-free thermoplastic polyurethane yarn using the same, where silica of a nanoscale size is used as a thickening agent suitable for the production of thin core-free yarns using the TPU mixed with the nanosilica to secure desired workability and properties and to draw the core-free TPU yarns continuously without thread breakage in the drawing process for a predetermined range of nanosilica content, as described herein. As further discussed below, for the purposes of this invention a passage "without thread breakage" may be equivalent to no thread breakage at all or to the thread breakage being negligible or negligibly small.

It is another object of the present invention to provide a resin for thermoplastic polyurethane yarn using added nanosilica and a method for manufacturing a thermoplastic polyurethane yarn using the same, where the core-free TPU yarns can be drawn continuously without thread breakage in the production of mono-filament core-free TPU yarns.

It is still another object of the present invention to provide a resin for thermoplastic polyurethane yarn using added nanosilica and a method for manufacturing a thermoplastic polyurethane yarn using the same, where the core-free mono-filament yarns having a denier count of 50 to 350 can be drawn continuously in the production of core-free TPU mono-filament yarns.

It is still further another object of the present invention to provide a resin for thermoplastic polyurethane yarn using added nanosilica and a method for manufacturing a core-free thermoplastic polyurethane yarn using the same, where TPU yarns can be drawn continuously without thread breakage in the production of multi-filament yarns using only TPU mixed with nanosilica.

It is still another object of the present invention to provide a resin for thermoplastic polyurethane yarn using nanosilica and a method for manufacturing a thermoplastic polyurethane yarn using the same, where a single filament yarn having a denier count of 50 or less can be drawn continuously in the production of multi-filament yarns using only TPU mixed with nanosilica.

The resin for thermoplastic polyurethane yarn according to the present invention comprises thermoplastic polyurethane mixed with nanosilica having a particle size of 100 nm or less.

The method for manufacturing a TPU (thermoplastic polyurethane) yarn using the resin for TPU comprises: (a) preparing liquid base materials of a polyol, an isocyanate and a glycol chain extender (e.g., a short-chain glycol) for polymerization of TPU pellets, selecting one of the aforementioned liquid base materials, adding nanosilica having a particle size of 100 nm or less, and mixing the selected liquid base material and the nanosilica together; (b) adding the nanosilica-dispersed liquid base material and the other two base materials into an extruder and performing polymerization into a TPU pellet to prepare a resin for a TPU yarn; and (c) adding the resin for TPU yarn into an extruder for yarn production and performing a melt extrusion to produce the thermoplastic polyurethane yarn.

Another method for manufacturing the TPU yarn comprises: (a) compounding a thermoplastic polyurethane and nanosilica having a particle size of 100 nm or less to prepare a master batch in a form of a pellet, mixing the master batch and thermoplastic polyurethane together and then compounding the master batch and the thermoplastic polyurethane to prepare a resin for production of yarn; and (b) adding the resin for yarn production into an extrusion for yarn production and performing a melt extrusion to prepare the thermoplastic polyurethane yarn.

In one embodiment, the TPU yarn can be a mono-filament yarn having a denier count of 50 to 350, and the added silica having the particle size of 100 nm or less.

In another embodiment, the TPU yarn can be a multi-filament yarn of which a single filament yarn has a denier count of 50 or less, and the added silica has a particle size of 100 nm or less.

The present invention not only can realize the effects of the thermoplastic polyurethane coated yarn disclosed in the prior patents/references, but also enables drawing core-free TPU yarns continuously without thread breakage by adding nanosilica (100 nm or less in particle size) for fabrication of the core-free TPU mono- or multi-filament yarns.

In addition, the present invention enables continuous drawing of a) a core-free TPU (with added nanosilica) multi-filament yarn having a plurality of single filament yarns, each with a denier count of 50 or less, and b) a mono-filament core-free TPU (with added nanosilica) yarn having a denier count of 50 to 350, both without thread breakage, thereby enhancing productivity.

According to one specific aspect of the invention, a core-free thermoplastic polyurethane (TPU) yarn formed with a resin, wherein the resin comprises a thermoplastic polyurethane and nanosilica mixed with the thermoplastic polyurethane by melt extrusion, wherein the core-free TPU yarn comprises the nanosilica in a range between 0.3 and 7 parts per hundreds resin (phr) and having a nanosilica particle diameter of 100 nm or less, which provides drawing of the core-free TPU continuously and without thread breaking.

According further to the one specific aspect of the invention, the resin can be prepared using liquid base materials of a polyol, an isocyanate and a glycol chain extender, wherein one of the liquid base materials is initially mixed with the nanosilica.

According further to the one specific aspect of the invention, the core-free TPU may be a multi-filament yarn formed with a plurality of single filament yarns, each of the single filament yarns having a denier count of 50 or less.

Still further according to the one specific aspect of the invention, the core-free TPU may be a mono-filament yarn having a denier count of 50 to 350.

According still further to the one specific aspect of the invention, the thermoplastic polyurethane of the resin may comprise one or more of a virgin thermoplastic polyurethane and a thermoplastic polyurethane scrap. Further, the thermoplastic polyurethane scrap may comprise remains left after a high-frequency or a hot-melt TPU process.

According yet further still to the one specific aspect of the invention, the nanosilica can be in a range between 0.5 and 1.5 phr which is an optimum range for achieving both high productivity and cost reduction.

Yet still further according to the one specific aspect of the invention, the core-free TPU yard is prepared using a master batch technology. Further, wherein the master batch can comprise about 30% of nanosilica forming a nanosilica-TPU master batch, so that the nanosilica range between 0.3 and 7 phr in the the core-free TPU yarn can be achieved by mixing the thermoplastic polyurethane with a corresponding content of the nanosilica-TPU master batch in a corresponding range between 1 and 23.3 phr.

DETAILED DESCRIPTION OF THE INVENTION

Hereinafter, various embodiments of the present invention will be described in detail. In the following description, representative examples will be provided for practicing corresponding embodiments of the invention to achieve the described technical solutions and results.

The term "nanosilica", as used herein, means silica having a primary particle size of 100 nm or less, and the term "yam", as used herein, refers to a core-free (mono- or multi-filament) TPU yarn, where the TPU comprises an added nanosilica. Furthermore, the term "producing TPU yarns continuously" means continuously drawing TPU yarns without thread breakage (or substantially without thread breakage).

The present invention is to realize a resin for thermoplastic polyurethane yarn using nanosilica and a method for manufacturing a thermoplastic polyurethane yarn using the same, where nanosilica having a particle size of 100 nm or less is added as a thickening agent for improving productivity and glossiness in the production of thermoplastic polyurethane yarns (preferably, mono- or multi-filament yarns using core-free TPU with added nanosilica). Specifically, this can provide an opportunity for the production of thin TPU yarns, such as mono-filament TPU yarns having a denier count of 50 to 350 and multi-filament TPU yarns having a denier count of 50 or less without applying a coating of TPU to the surface of polyester or nylon yarns as disclosed in the above-mentioned prior patents, thereby securing desired workability and properties and realizing continuous drawing of TPU yarns without thread breakage (or substantially without thread breakage).

As stated above, nanosilica (having a primary particle size of 100 nm or less) can be used in order to draw TPU yarns continuously without thread breakage in the continuous production of TPU yarns. The nanosilica in the present invention can be used in the production of a thin multi-filament yarn (that is, a single filament yarn) having a denier count of 50 or less, because such a thin filament yarn cannot be drawn with silica of the normal size. Moreover, the nanosilica of the present invention is also can be used in the production of mono-filament yarns (e.g., with denier count of 50 to 350) in order to draw the yarns continuously without thread breakage in the drawing process.

The present invention also proposes a method for manufacturing a core-free thermoplastic polyurethane (TPU) yarn, which method comprises compounding a master batch using nanosilica and thermoplastic polyurethane and then performing a melt extrusion in an extruder for yarn production.

For this purpose, it is necessary to disclose a TPU resin composition used in the fabrication of the thermoplastic polyurethane yarn and its preparation method; a method for preparing a master batch for thermoplastic polyurethane yarn and its composition; and a specific method for processing a thermoplastic polyurethane yarn using the TPU resin or the master batch. Such methods are applied in the same manner in the fabrication of mono-filament yarns and multi-filament yarns.

Various embodiments of the present invention are described in detail in the following examples below.

The present invention is directed to a method for processing or manufacturing a thermoplastic polyurethane (hereinafter, referred to as "TPU") yarn using TPU alone without applying a coating of TPU to the surface of a polyester or nylon yarn.

The TPU as used in the present invention may be a TPU in the form of a virgin TPU. The virgin TPU can be prepared by polymerizing short-chain glycols, such as a polyester glycol, a polyether glycol, a polycaprolactone, etc. used as a chain extender with an aromatic isocyanate and an aliphatic isocyanate.

The present invention may also use any kind of TPU scrap, including footwear TPU scraps remaining after a high frequency process or TPU scraps after a hot melt TPU process, instead of the virgin TPU. Such TPU scraps may be used alone or in combination with the virgin TPU.

In the production of core-free TPU yarn, TPU alone without applying a coating of TPU to the surface polyester or nylon yarns can be used. According to an embodiment of the present invention, adding nanosilica having a particle size of 100 nm or less can be used, as further discussed herein, to draw the TPU yarn continuously and without/ substantially without thread breakage during the extrusion/ production process, thereby enhancing productivity.

In other words, one embodiment of the invention can include adding nanosilica powder having a particle size of 100 nm or less to one of liquid base materials for polymerization of TPU pellets, the liquid base materials comprising a polyol, an isocyanate and a glycol chain extender (e.g., a short-chain glycol), sufficiently mixing all liquid base materials together, and performing polymerization into TPU pellets to prepare a resin for single type yarn processing. In this regard, the content of the nanosilica in the prepared resin is 10% and below. Adding the nanosilica in an amount of greater than 10% makes the mixing difficult.

In an alternative embodiment, the present invention can include concentrating and compounding nanosilica powder having a particle size of 100 nm or less in general TPU to prepare a master batch and then adding the master batch to a TPU resin by the content to prepare a TPU resin for single type yarn processing. In the preparation of the master batch, the content of the nanosilica can be at most 40%. The master batch is added to the TPU by the content to prepare a TPU resin for single type yarn processing. When the content of the nanosilica exceeds 40%, mixing with the TPU is difficult to perform, making impossible to manufacture a master batch and a TPU yarn as well. Then, according to one embodiment of the invention, adding the nanosilica having a particle size of 100 nm or less in a content of up to 40% to the TPU can be used. For the preparation of a highest quality master batch, the content of the nanosilica can be 30%.

The following descriptions are given as to: (1) a method of preparing a resin for TPU yarn by adding nanosilica having a particle size of 100 nm or less to a liquid base material; (2) a method of preparing a master batch by mixing nanosilica having a particle size of 100 nm or less and TPU; and (3) a method of manufacturing a core-free single type TPU yarn using the resin for TPU yarn or the master batch.

1. A method for preparing resin for TPU yarn according to an embodiment of the present invention is outlined below.

The preparation method of a resin for TPU yarn can involve adding nanosilica to liquid base materials in the polymerization of TPU pellets and performing a polymerization to prepare the resin. For example, the preparation method may comprise four steps as follows:

Step 1: Liquid base materials for general polymerization of TPU pellets are prepared. More specifically, a polyol, an isocyanate and a short-chain glycol are prepared.

Step 2: One of the liquid base materials prepared in Step 1 is selected, and nanosilica powder having a particle size of 100 nm or less is added to the selected liquid base material. During the mixing process, the temperature can be from 80 to 100° C. and the mixing speed from 20 to 30 rpm. For example, the present invention may include mixing nanosilica and polyol together.

Step 3: The liquid base material in which the nanosilica is sufficiently dispersed in Step 2 and the other two liquid base materials are added into a reactive extruder at the same time to perform a polymerization into TPU pellets.

Step 4: The TPU pellets polymerized in Step 3 are dried and annealed to prepare a desired resin for the TPU yarn according to the present invention.

2. A method for preparing a master batch according to an embodiment of the present invention can be outlined as follows:

Step 1: The above-suggested TPU (e.g., virgin TPU, TPU scrap, or a mixture of virgin TPU and TPU scrap) and nanosilica having a particle size of 100 nm or less are weighed. In this regard, the content of the nanosilica is not to exceed 40%.

Step 2: The nanosilica and the TPU are added into a general kneader and mixed together at temperature of 100 to 120° C. and a mixing speed of 20 to 30 rpm.

Step 3: The TPU mixed with the nanosilica is cooled down and pulverized to a diameter smaller than 10 mm. The pulverized TPU is added into a general twin extruder. The temperature of the twin extruder can be 150 to 200° C.

Step 4: A cooling water at 15 to 20° C. is added to the resin prepared in the twin extruder to make the resin into pellets.

Step 5: The master batch prepared throughout Steps 1 to 4, more specifically the master batch made into pellets is dried and annealed by a general method.

Step 6: The master batch is mixed with normal TPU to prepare a TPU resin for yarn processing.

3. A method for preparing the TPU yarn according to an embodiment of the the present invention is further outlined below.

The preparation method for TPU yarn as specifically described below is to prepare a core-free single type TPU yarn without applying a coating of TPU to the surface of a polyester or nylon yarn as disclosed in the prior patents.

Specific descriptions are given to a method for manufacturing a mono-filament yarn using the core-free TPU to and a method for manufacturing a multi-filament yarn using the core-free TPU as described herein.

(A) A method for manufacturing mono-filament yarn according to an embodiment of the present invention can be outlined as follows:

Step 1: Thermoplastic polyurethane containing nanosilica having a particle size of 100 nm or less is prepared. Preferably, a resin for TPU yarn with nanosilica or a master batch with nanosilica is mixed with TPU to prepare a TPU resin. The TPU resin is added into a general extruder for processing mono-filament yarns and subjected to melt extrusion at 150 to 230 0c_

Step 2: After melt extrusion in the extruder, the (TPU) yarn coming out from the dice of the extruder is cooled down with a cooling water at 25 to 40° C.

Step 3: The cooled yarn is drawn. In the present invention, the yarn is drawn to at most 7 times its original length, because it breaks when drawn to more than 7 times.

Step 4: The drawn yarn is annealed at 150 to 160° C. for 30 to 60 seconds in a general heat chamber.

Step 5: The annealed TPU yarn is wound up.

As described above, the present invention uses nanosilica having a particle size of 100 nm or less to continuously draw the TPU yarn without thread breakage in the drawing step (Step 3) and the winding step (Step 5) in the manufacture of mono-filament (TPU) yarns.

(B) A method for manufacturing multi-filament yarn, according to an embodiment of the present invention can be further outlined as follows:

Step 1: Thermoplastic polyurethane containing nanosilica having a particle size of 100 nm or less is prepared. Preferably, a resin for TPU yarn with nanosilica or a master batch with nanosilica is mixed with TPU to prepare a TPU resin. The TPU resin is added into a general extruder for processing mono-filament yarns and subjected to melt extrusion at 150 to 250 0c_

Step 2: After melt extrusion in the extruder, the (TPU) yarn coming out from the dice of the extruder is collected by the number of fillers (for example, 36 fillers, 48 fillers, etc.). Preferably, the yarn coming out from the dice is air-cooled down to 25 to 40° C. when collected by the number of fillers.

Step 3: The collected yarn in Step 2 is drawn. In the present invention, the yarn is drawn to at most 7 times its original length, because it breaks when drawn to more than 7 times.

Step 4: The TPU yarn drawn in Step 3 is wound up.

According to a further embodiment of the invention, a core-free thermoplastic polyurethane (TPU) yarn can be formed with a resin, wherein the resin comprises a thermoplastic polyurethane and nanosilica mixed with the thermoplastic polyurethane by melt extrusion, wherein the core-free TPU yarn comprises the nanosilica in a range between 0.3 and 7 parts per hundreds resin (phr) and having a nanosilica particle diameter of 100 nm or less, which provides drawing of the core-free TPU continuously and without thread breaking. The applicant has not observed any thread breakage in the range between 0.3 and 7 parts per hundreds resin (phr). However, it is noted that in theory, e.g., when a duration of the extrusion process becomes "infinitely" long, the thread breakage may occur. However, for the purposes of the present invention, these thread breaking occurrences would be negligible or negligibly small during a production/manufacturing process. In addition, or alternatively, a desired predefined threshold can be established for the the thread breaking occurrences for different nanosilica ranges (e.g., beyond 0.3 to 7 phr). Then drawing the core-free TPU continuously and substantially without thread breakage during the production/manufacturing process can be associated with (or be equivalent to) the thread breaking occurrences being below a desired small predefined established threshold.

The nanosilica range between 0.3 and 7 phr represents an unexpected and original/new result for achieving high productivity, which was not reported or claimed before, which is described further in in reference to Tables 2 and 3 herein. According to another embodiment, the nanosilica can be in a range between 0.5 and 1.5 phr which is an optimum range for achieving both high productivity and cost reduction, thus representing another unexpected and original/new result which was not reported or claimed before.

As described herein, the TPU resin with added nanosilica in the range between 0.3 and 7 phr may be prepared using liquid base materials of a polyol, an isocyanate and a glycol chain extender (e.g., a short-chain glycol), wherein one of the liquid base materials is initially mixed with the nanosilica, which is further elaborated in Table 2 herein.

As further described herein, as an alternative, the aforementioned resin with nanosilica in the range between 0.3 and 7 phr may be prepared using a master batch technology, wherein the master batch can comprise about 30% of nanosilica forming a nanosilica-TPU master batch, so that the nanosilica range between 0.3 and 7 phr in the the core-free TPU yarn is achieved by mixing the thermoplastic polyurethane with a corresponding content of the nanosilica-TPU master batch in a corresponding range between 1 phr and 23.3 phr, as further elaborated in Table 3 herein.

According to a further embodiment, the resin described above, can be used to form a core-free TPU which is a multi-filament yarn formed with a plurality of single filament yarns, each of the single filament yarns having a denier count of 50 or less, or to form another core-free TPU which is a mono-filament yarn having a denier count of 50 to 350.

According to another embodiment, the thermoplastic polyurethane of the resin may comprise one or more of a virgin thermoplastic polyurethane and a thermoplastic polyurethane scrap, where the thermoplastic polyurethane scrap can comprise remains left after a high-frequency or a hot-melt TPU process.

Table 1 (corresponding to Table 3 in the parent U.S. patent application Ser. No. 15/479,564 filed on Apr. 5, 2017, published as US 2018/0100050).) shows a comparison of physical characteristics between a single type TPU yarn made using nanosilica and a single type TPU yarn made using general silica. Namely, the test results are given specifically to present a comparison between a TPU yarn prepared using nanosilica having a particle size of 100 nm or less (a sample/resin with a brand name/test grade NS-75D-4) and a TPU yarn prepared using silica having a particle size of 300 to 500 nm (a sample/resin with a brand name/test grade NS-75D-10).

The resin NS-75D-4 comprises a master batch containing 30 wt. % of nanosilica (with a particle size of 100 nm or less) added in the amount of 10 phr, and mixed with a general TPU to prepare a core-free TPU yarn. The resin NS-75D-10 comprises the master batch containing 30 wt. % of silica/general silica (with a particle size of 300-500 nm) added in the amount of 10 phr, and mixed with the general TPU to prepare a further core-free TPU yarn.

TABLE 1

| Items | Using general silica | Using nanosilica | Ref. |
|---|---|---|---|
| TPU grade | Resin for single type TPU yarn (brand name: NS-75D-10) | Resin for single type yarn (brand name: NS-75D-4) | Compound is provided by mixing 10phr of TPU with 30 wt % of nanosilica |
| Silica Primary particle size | 300-500 nm | 100 nm or less | The primary particle size of general nano silica are defined below 100 nm. |

TABLE 1-continued

| Items | Using general silica | Using nanosilica | Ref. |
| --- | --- | --- | --- |
| TPU MFI (melt flow index) | 7.3 | 8.35 | 230° C., 2.16 kgf |
| TPU Tfb (flow beginning temp.) | 224.5 | 222.3 | |
| TPU tensile strength | 250 kgf/cm$^2$ | 350 kgf/cm$^2$ | Using injected specimens |
| TPU tear strength | 178 kgf/cm | 205 kgf/cm | Using injected specimens |
| TPU specific gravity | 1.23-1.21 | 1.22-1.25 | glee |
| TPU hardness | 75 ± 3D | 75 ± 3D | Shore D |
| TPU yarn thickness | 150-200 denier | 150-200 denier | Mono-filament yarn |
| TPU surface condition | Very coarse | Good (smooth) | |
| Workability | Silica size causes severe step difference and difficulty in extrusion and drawing processes | Nanosilica is used to serve as a drawing reinforcement during the drawing process to secure workability without step difference | |

As can be seen from Table 1, the single type TPU yarn prepared using the general silica (namely, silica having a particle size of 300-500 nm) has the yarn surface course with poor production workability (e.g., including extrusion workability). Particularly, it is impossible to manufacture a thin multi-filament yarn in which the single filament yarn (namely, filler-based) has a denier count below 50. However, as can be seen from Table 1 and according to various embodiments of the present invention, the single type (mono- or multi-filament) TPU yarn can be prepared by adding nanosilica having a particle size of 100 nm or less, which provides the yarn surface being smooth and secures good productivity and workability as the TPU yarn can be drawn continuously and without/substantially without thread breakage during the production process.

As described herein, the present invention uses nanosilica having a particle size of 100 nm or less to continuously draw the core-free TPU yarn without/substantially without thread breakage and having a denier count of 50 or less for manufacturing of multi-filament (TPU) yarns.

In order to determine the physical characteristic of the TPU yarn (preferably, mono- and multi-filament yarns) prepared by the above-described methods/techniques as described herein, Tables 2 and 3 presents further results for TPU yarns containing nanosilica having a particle size of 100 nm or less.

First, tests have been performed by adding nanosilica to a general TPU by its content and a polymerization is performed to prepare corresponding resins for TPU yarns. New and unexpected results have been achieved as presented in Table 2 regarding thread breakage and surface condition in the production of mono-/multi-filament TPU yarns depending on the content of nanosilica. The results presented in Table 2 are more accurate and detailed compared to earlier results presented in Table 1 of the parent U.S. patent application Ser. No. 15/479,564 filed on Apr. 5, 2017 (published as US 2018/0100050).

In the Table 2 (see a third column), nanosilica is added in the amounts of 0, 0.3, 0.5, 1, 1.5, 2, 2.5, . . . , 9.5 and 10 phr respectively, and used for polymerization to prepare corresponding resins for TPU yarns containing nanosilica according to various embodiments of the invention.

Moreover, in Table 2 (see a first column), terms "T-90AB-1", "T-90AB-3", "T-90AB-5", through "T-90AB-100", refer to the brand names (or test grades) of the resins for corresponding TPU yarns, and more specifically, for the corresponding TPU yarns containing nanosilica having a particle size of 100 nm or less in the amounts of 0, 0.3, 0.5, 1, 1.5, 2, 2.5, . . . , 9.5 and 10 phr respectively.

The extrusion workability and the surface condition of the TPU yarns can be described with reference to Table 2 as follows.

When a yarn is processed using a resin for TPU yarn with the brand name T-90AB-1, prepared without the novel resin mixed with nanosilica, the resin is extremely runny during the extrusion process, ending up producing TPU yarns with coarse surface and high breakage (70-80%).

When a yarn is processed using a resin for TPU yarn with the brand name T-90AB-3, containing nanosilica in an amount of 0.3 phr, the production workability is good without thread breakage and the surface of the yarn is smooth.

When a yarn is processed using a resin for TPU yarn containing nanosilica in an amount being above 0.3 phr and up to 7 phr, corresponding to the brand names from T-90AB-5 to T-90AB-70, the production workability is good without thread breakage and the surface of the yarn is smooth.

However, when a yarn is processed using a resin for TPU yarn containing nanosilica in an amount being above 7 phr and up to 10 phr, corresponding to the brand names from T-90AB-75 to T-90AB-100, the surface condition and extrusion workability are deteriorating (e.g., thread breakage being in an unacceptable range of 17% to 70%). It is noted that the percentage for the thread breakage shown in Tables 2 and 3 is calculated as a percentage of broken strands among total number of strands used in the extrusion process for mono-filament yarns or mufti-filament yarns.

Moreover, when a yarn is processed using a resin for TPU yarn containing nanosilica above 10 phr, not only the surface of the TPU yarn and extrusion workability during the extrusion are deteriorating substantially, but also a flow rate (e.g., the melt flow index MI presented in a second column in Table 2 being steady up to 10 phr of the nanosilica) was lowered significantly (not shown in Table 2) and the dispersing ability was lowered to a degree, so that it was unpractical to add more nanosilica than 10 phr (i.e., it becomes difficult to mix the nanosilica with the liquid base material).

TABLE 2

| Test Grade (Brand Name) | MI (200° C., 2.16 kg) (g/10 min) | Content of nano silica in TPU yarn phr | Production workability and surface condition | |
|---|---|---|---|---|
| | | | Multi-filament yarn (150 denier, 24 fillers) | Mono-filament yarn (150 denier) |
| T-90AB | 44.6 | 0 | Unworkable, Thread breakage (80%) | Thread breakage (70%), Rough surface |
| T-90AB-3 | 40.9 | 0.3 | Good workability | Good workability, Good surface |
| T-90AB-5 | 42.8 | 0.5 | | |
| T-90AB-10 | 42.3 | 1 | | |
| T-90AB-15 | 43.6 | 1.5 | | |
| T-90AB-20 | 48.1 | 2 | | |
| T-90AB-25 | 42.4 | 2.5 | | |
| T-90AB-30 | 46.3 | 3 | | |
| T-90AB-35 | 42.1 | 3.5 | | |
| T-90AB-40 | 43.5 | 4 | | |
| T-90AB-45 | 37.5 | 4.5 | | |
| T-90AB-50 | 41.2 | 5 | | |
| T-90AB-55 | 36.2 | 5.5 | | |
| T-90AB-60 | 33.1 | 6 | | |
| T-90AB-65 | 36.4 | 6.5 | | |
| T-90AB-70 | 39.3 | 7 | | |
| T-90AB-75 | 39.6 | 7.5 | Less workability, Thread breakage (20%) | Less workability, Thread breakage (17%) |
| T-90AB-80 | 41.1 | 8 | Less workability, Thread breakage (30%) | Less workability, Thread breakage (24%) |
| T-90AB-85 | 38.4 | 8.5 | Less workability, Thread breakage (38%) | Less workability, Thread breakage (32%) |
| T-90AB-90 | 38.7 | 9 | Less workability, Thread breakage (56%) | Less workability, Thread breakage (44%) |
| T-90AB-95 | 41.5 | 9.5 | Less workability, Thread breakage (62%) | Less workability, Thread breakage (54%) |
| T-90AB-100 | 38.8 | 10 | Less workability, Thread breakage (70%) | Less workability, Thread breakage (66%) |

Second, tests have been performed by varying the amount of the master batch containing nanosilica mixed with general TPU. New and unexpected results have been achieved as presented in Table 3 regarding thread breakage and surface condition in the production of mono/multi filament TPU yarns depending on the content of nanosilica (using a master batch technology). The results presented in Table 3 are more accurate and detailed compared to results presented in Table 2 of the parent U.S. patent application Ser. No. 15/479,564 filed on Apr. 5, 2017 (published as US 2018/0100050).

Furthermore, the new and unexpected results presented in Table 2 herein regarding the thread breakage and surface condition in the production of mono-/multi-filament TPU yarns depending on the content of nanosilica are confirmed for the master batch technique results demonstrated in Table 3.

In other words, the master batch of the present invention (containing 30 wt. % of nanosilica) is provided in amounts of 0 phr, 1 phr, 1.7 phr, 3.3 phr, . . . , 42.8 phr and 43.3 phr, etc., as specified in a third column of Table 3, and mixed with general TPU to prepare a TPU yarn. A comparison is made regarding the production workability and the surface condition for prepared samples.

In the Table 3 (see first column), the terms "T-90ABM", "T-9nABM-3", "T-90ABM-10" through "T-90ABM-100", refer to the brand names (test grades) of the resins for TPU yarn, more specifically the resins for TPU yarns containing nanosilica having a particle size of 100 nm or less in amounts of 0, 0.3, 0.5, 1, 1.5, 2, 2.5, . . . 9.5 and 10 phr, respectively.

The production (e.g., including the extrusion) workability and the surface condition of the TPU yarns can be described with reference to Table 3 as follows.

When a yarn is processed using a resin for TPU yarn with the brand name: T-90ABM-1 prepared without adding nanosilica in the master batch, the resin is extremely runny during the extrusion causing poor extrusion/production workability with a high thread breakage (70-80%).

TABLE 3

| Test Grade (Brand Name) | MI (200° C., 2.16 kg, g/10 min) | Content of Silica master batch (phr) | Content of Nanosilica (phr) | Production workability and surface condition | |
|---|---|---|---|---|---|
| | | | | Multi filament yarn (150d/24f) | Mono filament yarn (150d) |
| T-90ABM | 44.6 | 0 | 0 | Unworkable, Thread breakage (80%) | Thread breakage (70%), Rough surface |
| T-90ABM-3 | 42.6 | 1 | 0.3 | Good workability | Good workability & Good surface |
| T-90ABM-5 | 39.4 | 1.7 | 0.5 | | |

TABLE 3-continued

| Test Grade (Brand Name) | MI (200° C., 2.16 kg, g/10 min) | Content of Silica master batch (phr) | Content of Nanosilica (phr) | Production workability and surface condition Multi filament yarn (150d/24f) | Mono filament yarn (150d) |
|---|---|---|---|---|---|
| T-90ABM-10 | 38.6 | 3.3 | 1 | | |
| T-90ABM-15 | 40.1 | 5 | 1.5 | | |
| T-90ABM-20 | 37.5 | 6.7 | 2 | | |
| T-90ABM-25 | 39.7 | 8.3 | 2.5 | | |
| T-90ABM-30 | 43.2 | 10 | 3 | | |
| T-90ABM-35 | 44.4 | 11.7 | 3.5 | | |
| T-90ABM-40 | 39.5 | 13.3 | 4 | | |
| T-90ABM-45 | 40.6 | 15 | 4.5 | | |
| T-90ABM-50 | 40.9 | 16.7 | 5 | | |
| T-90ABM-55 | 38.9 | 18.3 | 5.5 | | |
| T-90ABM-60 | 39.4 | 20 | 6 | | |
| T-90ABM-65 | 37.6 | 21.7 | 6.5 | | |
| T-90ABM-70 | 40.2 | 23.3 | 7 | | Good workability |
| T-90ABM-75 | 37.2 | 25 | 7.5 | Less workability, Thread breakage (13%) | Less workability, Thread breakage (10%) |
| T-90ABM-80 | 39.1 | 26.7 | 8 | Less workability, Thread breakage (29%) | Less workability, Thread breakage (26%) |
| T-90ABM-85 | 41.5 | 28.3 | 8.5 | Less workability, Thread breakage (41%) | Less workability, Thread breakage (34%) |
| T-90ABM-90 | 40.7 | 30 | 9 | Less workability, Thread breakage (58%) | Less workability, Thread breakage (48%) |
| T-90ABM-95 | 42.8 | 31.7 | 9.5 | Less workability, Thread breakage (63%) | Less workability, Thread breakage (58%) |
| T-90ABM-100 | 43.3 | 33.3 | 10 | Less workability, Thread breakage (75%) | Less workability, Thread breakage (68%) |

When a yarn is processed using a resin for TPU yarn with the brand name T-90ABM-3) containing the master batch (nanosilica-TPU master batch) in an amount of 1 phr, corresponding to the content of nanosilica in TPU yarn equal to 0.3 phr, as shown in a fourth column of Table 3, the production workability is good without thread breakage and the surface of the yarn is smooth.

When a yarn is processed a resin for TPU yarn with the brand name from T-90ABM-5 to T-90ABM-70, containing the master batch (nanosilica-TPU master batch) of above 1 phr up to 23.3 phr, corresponding to the content of nanosilica in TPU yarn above 0.3 phr up to 7 phr as shown in the fourth column of Table 3, the production (e.g., extrusion) workability is good without thread breakage and the surface condition is good as well.

However, when a yarn is processed using a resin for TPU yarn with the brand names from T-90ABM-75 to T-90ABM-100, containing the master batch (nanosilica-TPU master batch) above 23.3 phr up to 43.3 phr, corresponding to the content of nanosilica in TPU yarn above 7 phr up to 10 phr as shown in the fourth column of Table 3, the surface condition and production (e.g., extrusion) workability are deteriorating (e.g., thread breakage being in the range of 10% to 75%).

Moreover, when a yarn is processed using a resin for TPU yarn containing nanosilica above 10 phr (corresponding to the added master batch of above 43.3 phr), not only the surface of the TPU yarn and production (e.g., including extrusion) workability is deteriorating significantly, but also the flow rate (e.g., the melt flow index MI presented in Table 3 being steady up to 10 phr of the nanosilica) was lowered and the dispersing ability was lowered to a degree, so that it was unpractical to add more of the master batch than 43.3 phr.

As a result of the mono-/mufti-filament processing tests by the contents of nanosilica demonstrated in Tables 2 and 3, it was confirmed that when the content of nanosilica was used in the range of 0.3 to 7 phr, a smooth processability was obtained without yarn-cutting phenomenon. If the content is below 0.3 phr or over 7 phr, the percentage of the yarn-cutting phenomenon is increased significantly beyond an acceptable threshold.

It is further concluded that as the content of nanosilica increased, the processability/workability had no problem up to 7 phr. However, a tensile strength was somewhat gradually decreased in a direction from 0.3 to 7 phr of nanosilica content. It is believed that the nanosilica acts as an impurity to lower the tensile strength. Moreover, considering the price and the optimum tensile strength, the use of a nanosilica range from 0.5 to 1.5 phr is considered to be the optimum amount for productivity and cost reduction. This represents another unexpected and original result which was not reported before and not previously claimed.

More specifically, when the content of nano silica is less than 0.3 phr based on the thermoplastic polyurethane resin, thread breakage occurs and/or the surface of the yarn becomes rough. If the content of nano silica exceeds 7 phr based on the thermoplastic polyurethane resin, there may be a problem of thread breakage occurrence at least in the spinning or drawing processes. The thermoplastic polyurethane yarn of the present invention contains 0.3-7 phr of nanosilica on the basis of a thermoplastic polyurethane resin, so that the yarn can be economically and effectively mass produced in a spinning and drawing process.

Unless defined otherwise, technical and scientific terms used herein have the same meaning as is commonly understood by one having ordinary skill in the art to which this disclosure belongs. The terms "first", "second", and the like, as used herein, do not denote any order, quantity, or importance, but rather are employed to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof, as well as additional items. The terms "connected" and "coupled" are not restricted to physical or mechanical connections or couplings, and can include electrical and optical connections or couplings, whether direct or indirect.

Furthermore, the skilled artisan will recognize the interchangeability of various features from different embodiments. The various features described, as well as other known equivalents for each feature, can be mixed and matched by one of ordinary skill in this art, to construct additional systems and techniques in accordance with principles of this disclosure.

It is to be understood that the foregoing description is intended to illustrate and not to limit the scope of the invention, which is defined by the scope of the appended claims. Other embodiments are within the scope of the following claims.

It is noted that various non-limiting embodiments described and claimed herein may be used separately, combined or selectively combined for specific applications. Further, some of the various features of the above non-limiting embodiments may be used to advantage, without the corresponding use of other described features. The foregoing description should therefore be considered as merely illustrative of the principles, teachings and exemplary embodiments of this invention, and not in limitation thereof.

What is claimed is:

1. A core-free thermoplastic polyurethane (TPU) yarn formed with a resin, wherein the resin comprises a thermoplastic polyurethane and nanosilica mixed with the thermoplastic polyurethane by melt extrusion, wherein the core-free TPU yarn comprises the nanosilica in a range between 0.3 and 7 parts per hundreds resin (phr) and having a nanosilica particle diameter of 100 nm or less, which provides drawing of the core-free TPU continuously and without thread breaking, wherein the core-free TPU is a multi-filament yarn formed with a plurality of single filament yarns, each of the single filament yarns having a denier count of 50 or less.

2. The core-free TPU yarn of claim 1, wherein the resin is prepared using liquid base materials of a polyol, an isocyanate and a glycol chain extender, wherein one of the liquid base materials is initially mixed with the nanosilica.

3. A core-free thermoplastic polyurethane (TPU) yarn formed with a resin, wherein the resin comprises a thermoplastic polyurethane and nanosilica mixed with the thermoplastic polyurethane by melt extrusion, wherein the core-free TPU yarn comprises the nanosilica in a range between 0.3 and 7 parts per hundreds resin (phr) and having a nanosilica particle diameter of 100 nm or less, which provides drawing of the core-free TPU continuously and without thread breaking, wherein the core-free TPU is a mono-filament yarn having a denier count of 50 to 350.

4. The core-free TPU yarn of claim 1, wherein the thermoplastic polyurethane of the resin comprises one or more of a virgin thermoplastic polyurethane and a thermoplastic polyurethane scrap.

5. The core-free TPU yarn of claim 4, wherein the thermoplastic polyurethane scrap comprises remains left after a high-frequency or a hot-melt TPU process.

6. The core-free TPU yarn of claim 1, wherein the nanosilica is in a range between 0.5 and 1.5 phr which is an optimum range for achieving both high productivity and cost reduction.

7. The core-free TPU yarn of claim 1, wherein the core-free TPU yard is prepared using a master batch technology.

8. The core-free TPU yarn of claim 7, wherein the master batch comprises about 30% of nanosilica forming a nanosilica-TPU master batch, so that the nanosilica range between 0.3 and 7 phr in the the core-free TPU yarn is achieved by mixing the thermoplastic polyurethane with a corresponding content of the nanosilica-TPU master batch in a corresponding range between 1 and 23.3 phr.

* * * * *